Oct. 17, 1972   V. G. LUCIEN   3,698,879
CHEVRON SHAPED ARTICLE AND A SANDWICH
STRUCTURE THEREFROM
Filed June 9, 1955   11 Sheets-Sheet 1

INVENTOR
LUCIEN VICTOR GEWISS
By Linton and Linton
ATTORNEYS

Oct. 17, 1972 V. G. LUCIEN 3,698,879
CHEVRON SHAPED ARTICLE AND A SANDWICH
STRUCTURE THEREFROM
Filed June 9, 1955 11 Sheets-Sheet 3
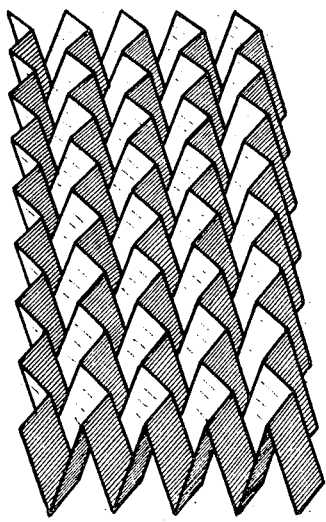
Fig.3
Fig.4
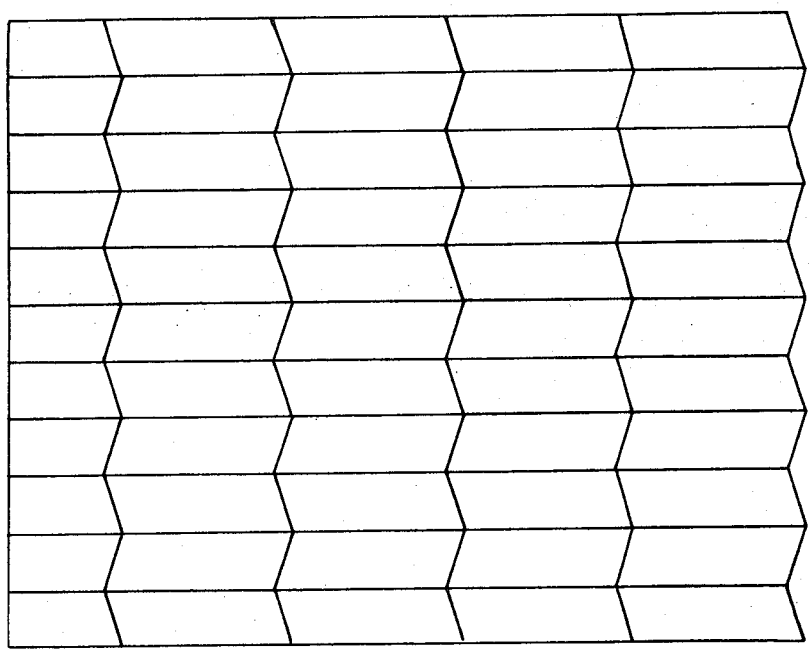
INVENTOR
LUCIEN VICTOR GEWISS
BY Linton and Linton
ATTORNEYS Oct. 17, 1972　　　V. G. LUCIEN　　　3,698,879
CHEVRON SHAPED ARTICLE AND A SANDWICH
STRUCTURE THEREFROM
Filed June 9, 1955　　　　　　　　　　　　11 Sheets-Sheet 4

INVENTOR
LUCIEN VICTOR GEWISS
By Linton and Linton
ATTORNEYS

INVENTOR
LUCIEN VICTOR GEWISS
BY Linton and Linton
ATTORNEYS

INVENTOR
LUCIEN VICTOR GEWISS
By Linton and Linton
ATTORNEYS

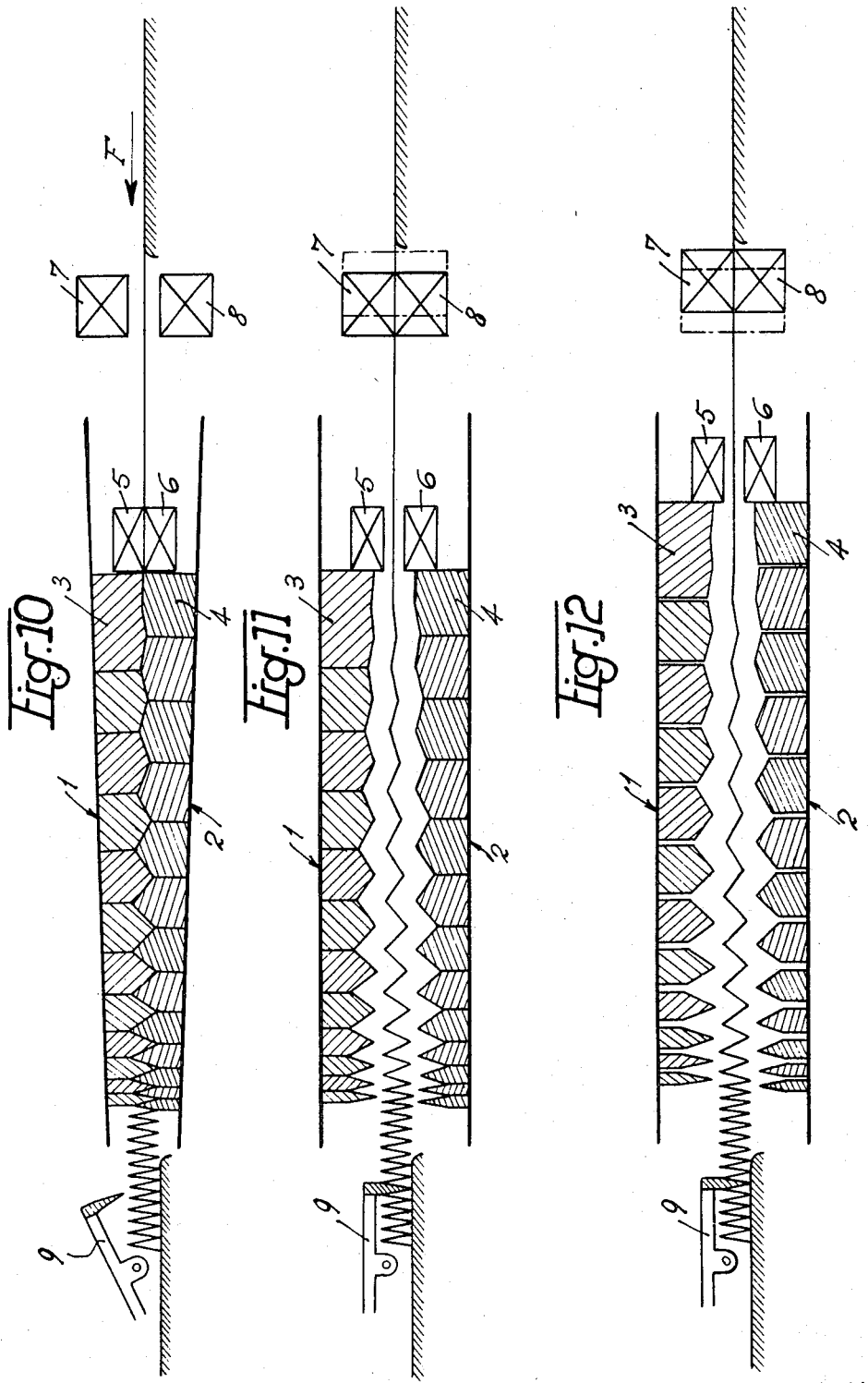

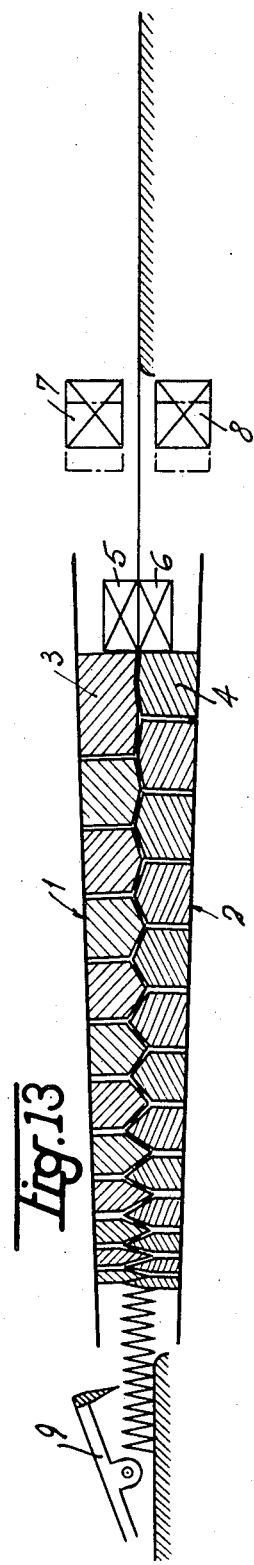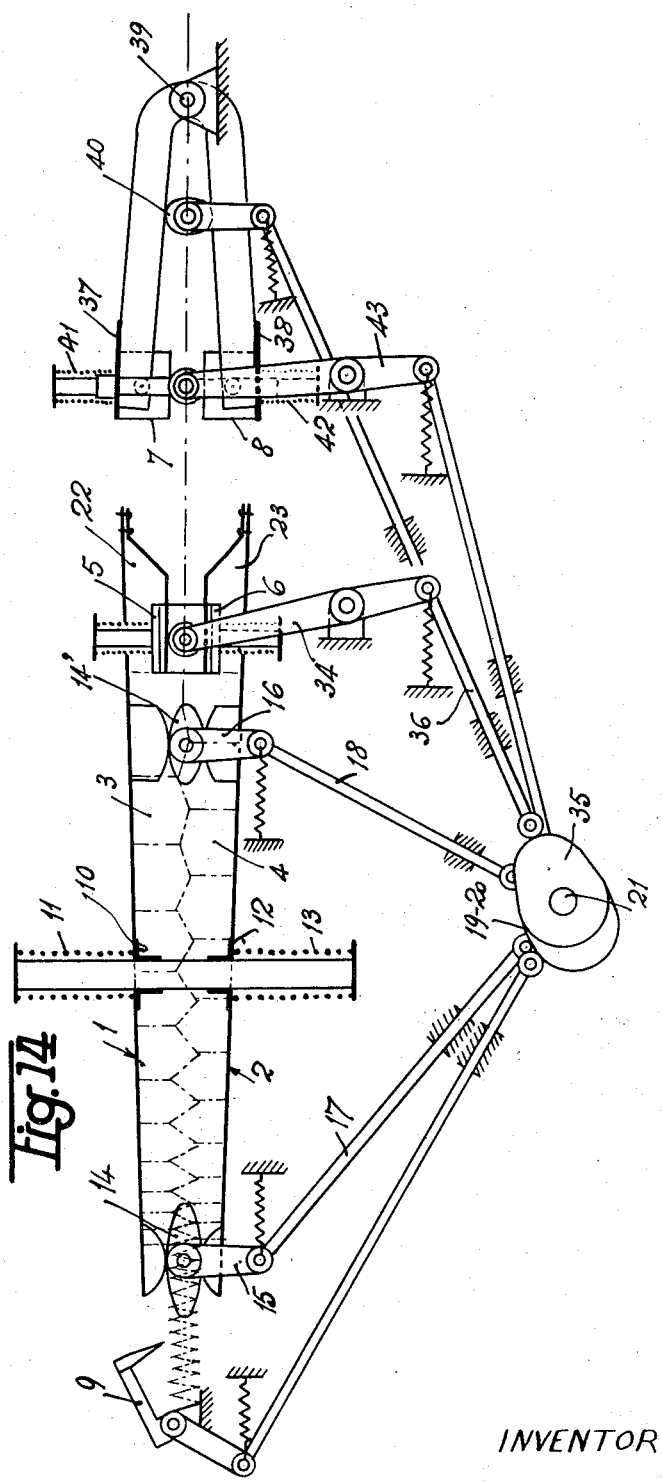

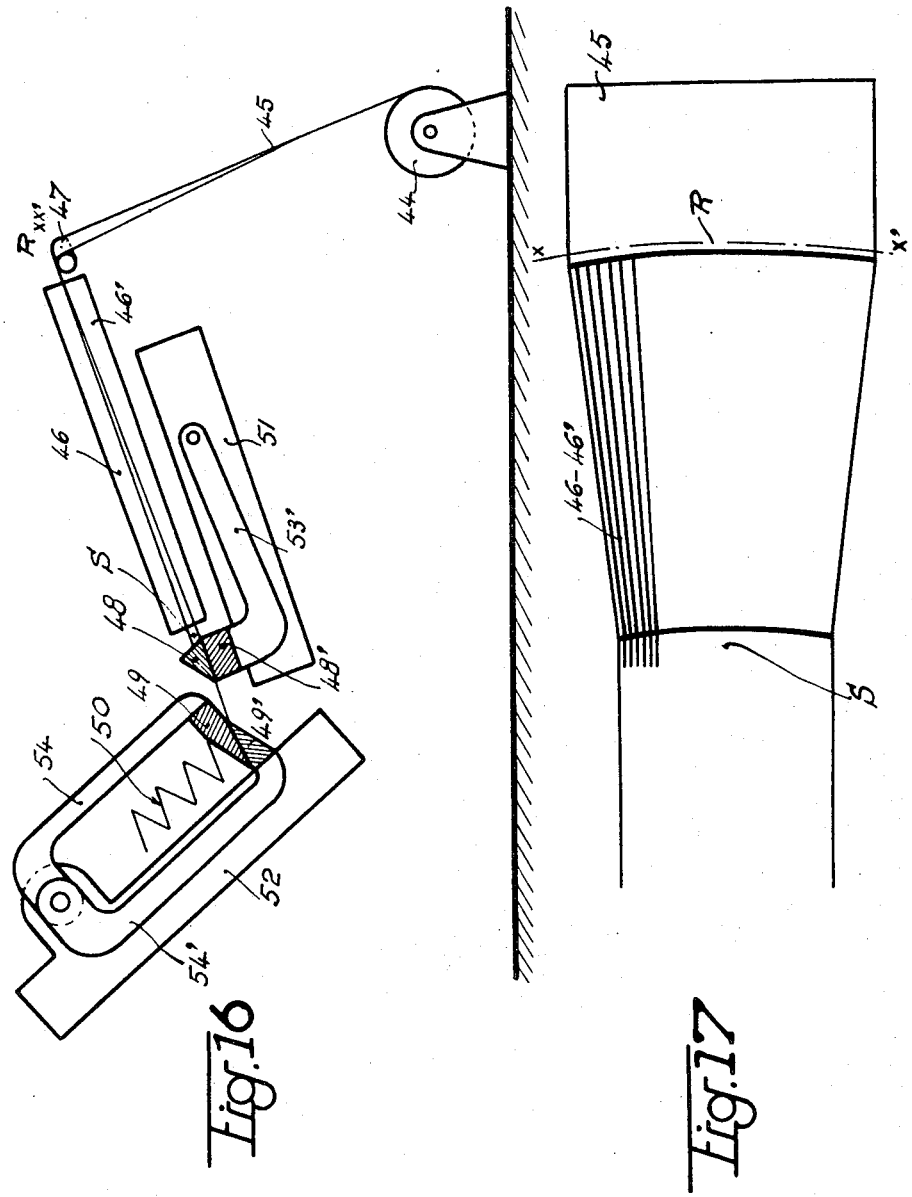

Oct. 17, 1972  V. G. LUCIEN  3,698,879
CHEVRON SHAPED ARTICLE AND A SANDWICH
STRUCTURE THEREFROM
Filed June 9, 1955  11 Sheets-Sheet 10
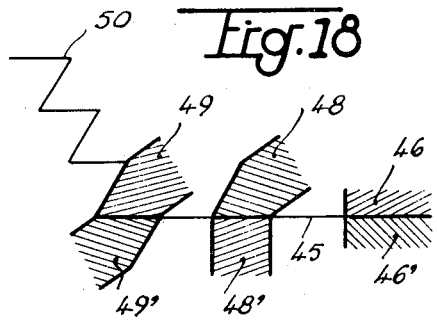
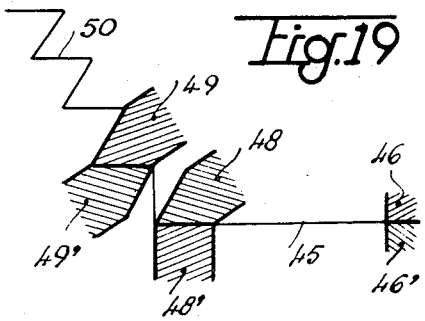
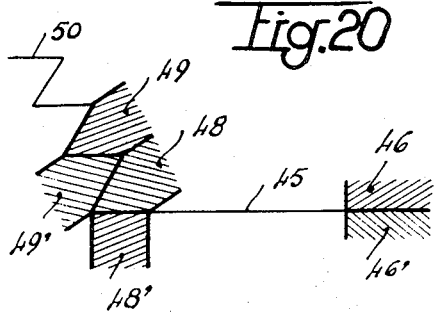
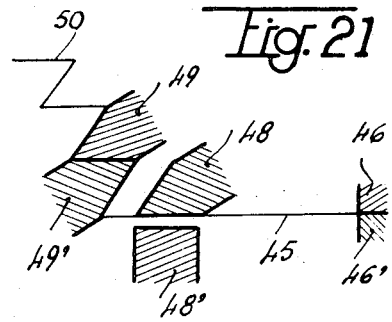
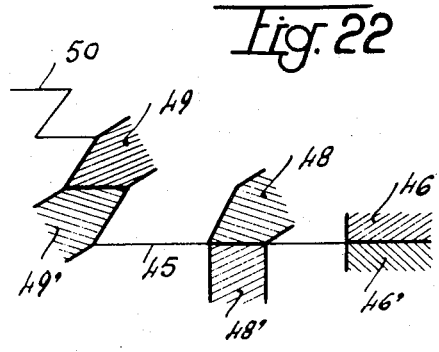
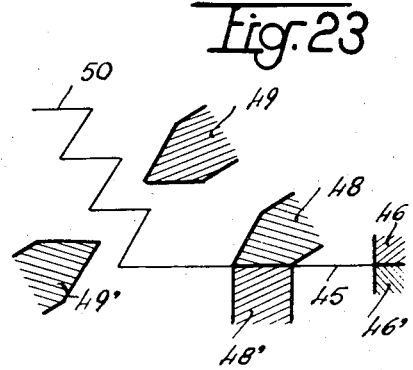
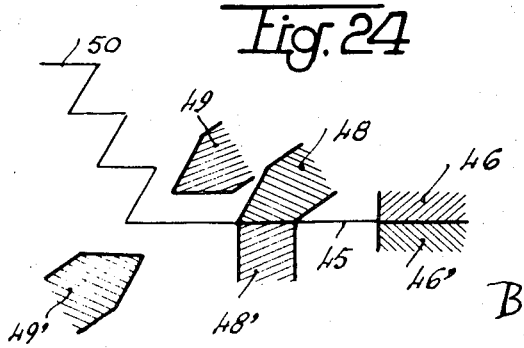
INVENTOR
LUCIEN VICTOR GEWISS
By Linton and Linton
ATTORNEYS Oct. 17, 1972  V. G. LUCIEN  3,698,879
CHEVRON SHAPED ARTICLE AND A SANDWICH
STRUCTURE THEREFROM
Filed June 9, 1955  11 Sheets-Sheet 11

INVENTOR
LUCIEN VICTOR GEWISS
By Linton and Linton
ATTORNEYS

United States Patent Office 3,698,879
Patented Oct. 17, 1972

3,698,879
CHEVRON SHAPED ARTICLE AND A SANDWICH STRUCTURE THEREFROM
Victor Gewiss Lucien, Ville d'Avray, France, assignor to Marc Wood Societe Anonyme pour la Promotion des Echanges Techniques Internationaux, Paris, France
Filed June 9, 1955, Ser. No. 514,171
Claims priority, application France, June 10, 1954, 670,772
Int. Cl. B32b 15/00
U.S. Cl. 29—191
24 Claims

ABSTRACT OF THE DISCLOSURE

The invention disclosed pertains a shape material which in general is sheet or plate like in form. It consists of a general chevron structure to be used structurally and also for various articles of manufacture. It pertains to a method of making which embraces forming various portions of the chevron shape by bending. It likewise includes a machine for forming the particular material.

Building and the like materials are already known which appear in the shape of recessed, corrugated or the like plates. For a predetermined thickness, such building materials have a generally reduced weight together with a large superficial area. These common basic properties are however generally not associated with certain further advantageous properties which would increase their fields of use and lead to more widely spread applications.

In particular, it would be of advantage with a view to answering more specifically the requirements of numerous applications, for such building materials to be provided with larger, more numerous or more uniformly distributed elementary bearing surfaces while said surfaces might be deformable or expansible to a very large extent in two mutually orthogonal directions.

It is also of interest in the case of certain particular applications for such materials to be produced not only in the shape of plates of a practically uniform thickness bounded by parallel surfaces, as is generally the case with recessed or corrugated structures of a known type, but more generally speaking of any suitable shapes defined by bounding surfaces also of any desired type, whether concave or convex or alternatingly convex and concave said surfaces being possibly different from generally plane surfaces.

It would also be of considerable interest to provide for the production of such materials with any substance, while having in all cases a resistance to crushing which is proportionally very high, such materials remaining however of a low cost price.

My invention has for its object to provide a novel article of manufacture constituted of a material the outer surfaces of which are provided with recesses and projections arranged alternatingly in accordance with a predetermined geometric law and which has been found as remarkably favorable to the obtention of the above referred to desired results although its advantages are by no means limited thereto. My invention includes also various methods and arrangements for the production of such novel materials together with numerous applications of the latter.

My improved material may be defined in its most general form as a solid having very small thickness, comprised between enclosing surfaces tangent to its outer surfaces along ridge lines broken at different points when changing direction, the ridge lines on one given surface being connected with the adjacent ridge lines on the same surface when such adjacent ridge lines are present and with the immediately following or preceding ridge lines on the other surface when such adjacent ridge lines are not present on the same surface, through flanks constituted by elementary ruled surfaces of any type having a single curvature, the sum of the angles formed by the sides of said elementary surfaces leading to any points of each of the ridge lines being always equal to 360°.

The solid structure of my invention corresponding to the above definition are generally provided with a plurality of series of more or less uniform zigzag grooves, more or less simular to V-shaped lines or chevrons facing alternate directions. For this reason, I will designate them hereinafter by the expression "chevron structures."

My invention covers also all the chevron structures of any general shape and thickness of which at least one surface has a configuration identical with that of one of the solid structures executed in accordance with the above definition and it also covers any structure derived directly therefrom when the identity in shape is obvious in a general manner with slight differences in detail for reasons which will appear hereinafter.

Further features of my invention together with its main advantages and various manners of executing it will appear readily from the reading of the following specification, reference being made to the accompanying drawings given by way of exemplification and by no means in a limiting sense, in said drawings:

FIG. 3 shows a chevron structure including exclusively equal parallelograms arranged symmetrically two by two.

FIG. 4 shows the structure of FIG. 3 developed on a plane.

FIGS. 10, 11, 12 and 13 are diagrammatic views of successive steps of a method for the gradual progressive embossing or folding of the structure which may be resorted to for the production of a chevron structure of the type illustrated in FIG. 9 with progressive increase of chevron pitch.

FIGS. 14 and 15 are diagrammatic plan and elevational views of different parts of the machine adapted to define the operative movements to be performed by a machine working in accordance with the first method by engagement between rigid jaws illustrated in FIGS. 10 to 13.

FIG. 16 is a diagrammatic side elevational view, partly sectional, of a machine adapted to execute the chevron folds in accordance with a second method.

FIG. 17 is a partial plan view corresponding to FIG. 16.

FIGS. 18 to 24 are partial diagrammatic cross-sectional views illustrating the positions of some of the chief components of the machine according to FIGS. 16 to 17 during an operative folding cycle.

Figure 1:
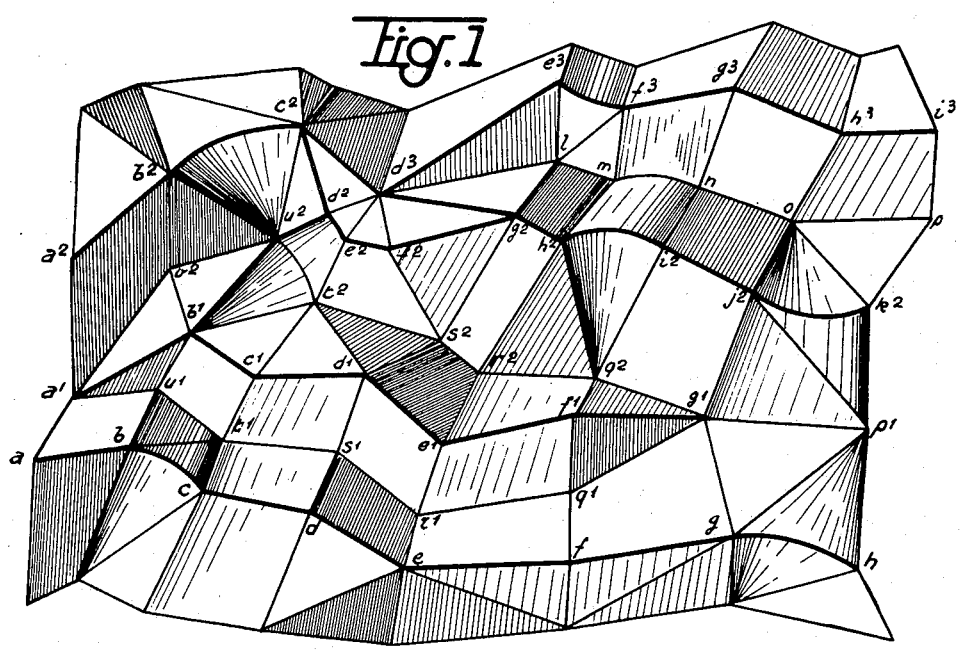
FIG. 1 is a perspective view of the outer configuration of a solid structure the elements of which correspond to the general definition of my invention.

In FIG. 1 illustrating a chevron structure corresponding to the general definition of the invention described hereinabove, one of the surfaces of the solid structure carries a plurality of independent ridge lines $a, b, c \ldots h, a^1, b^1, c^1 \ldots g^1$ together with a bundle of ridge lines including two adjacent sections $a^2, b^2, c^2 \ldots g^2$ and $c^2, d^3$ which latter opens in its turn at $d^3$ to form two further ridge lines $d^2, g^2, h^2 \ldots k^2$ and $d^3, e^3, f^3 \ldots i^3$ The other surface of the structure carries the ridge line shown in inner lines $d^3, l, m \ldots p$; and a bundle of ridge lines $p^1, g^1$ diverging at the point $g^1$ into two sections $g^1, q^1, r^1 \ldots a^1$ and $g^1, q^2, r^2 \ldots v^2, a^1$.

The two surfaces enclosing the structure and the two surfaces of the latter are thus provided in this particular case with common points $a^1, g^1$ and $d^3$ constituted by the meeting points between ridge lines on the two surfaces.

The different elementary ruled surfaces filling in an uninterrupted manner the flanks or spaces defined between the ridges of the chevron structure mate to a certain extent the shape of each of the lines bounding them since their common rectilinear generating line follows the different outlines of the elementary surfaces while forming a certain angle therewith. The flanks constituted by sequences of elementary surfaces of the chevron structure are generally provided with folds and bending lines at each abrupt modification in the direction or in the curvature of the ridge line. All these breaks and bending lines form straight elements since they form the intersection between adjacent ruled surfaces.

Under such conditions, the bodies in space formed by the elementary ruled surfaces with a single curvature following each other along the flanks of the structure defined by the ridge lines are limited by three or four lines of which two at least are straight and are formed by folds or bending lines separating said elementary surfaces. These elementary surfaces form thus flat four-sided members bounded by straight elements, meeting each other or parallel, of two successive ridge lines. Between a straight element of one of two successive ridge lines and a point of the other ridge line, said elementary surfaces form flat triangles. Between the homothetic elements of two incurved or concave successive ridge lines, the four-sided figures are constituted by sections of a cylinder, of a frusto-cone, of an ellipsoid, of a paraboloid, etc. Between one curved element of one ridge line and a point of the next ridge line, these elementary surfaces form three-sided portions of a cone or of an approximately conical surface.

Each of the elementary surfaces comprised between two successive such ridge lines may be developed on a plane, since it is constituted exclusively of ruled figures having three or four sides, which are flat or incurved, are positioned endwise and are separated from one another by straight ridge lines which may be straightened out so that said figures are actually developable on a plane. Each of the flanks formed by the elementary surfaces along any ridge line assumes consequently when flattened the shape of a succession of flattened three or four-sided figures with straight or curvilinear sides separated by the folds or bending lines defining them on the solid chevron structure.

Figure 2:
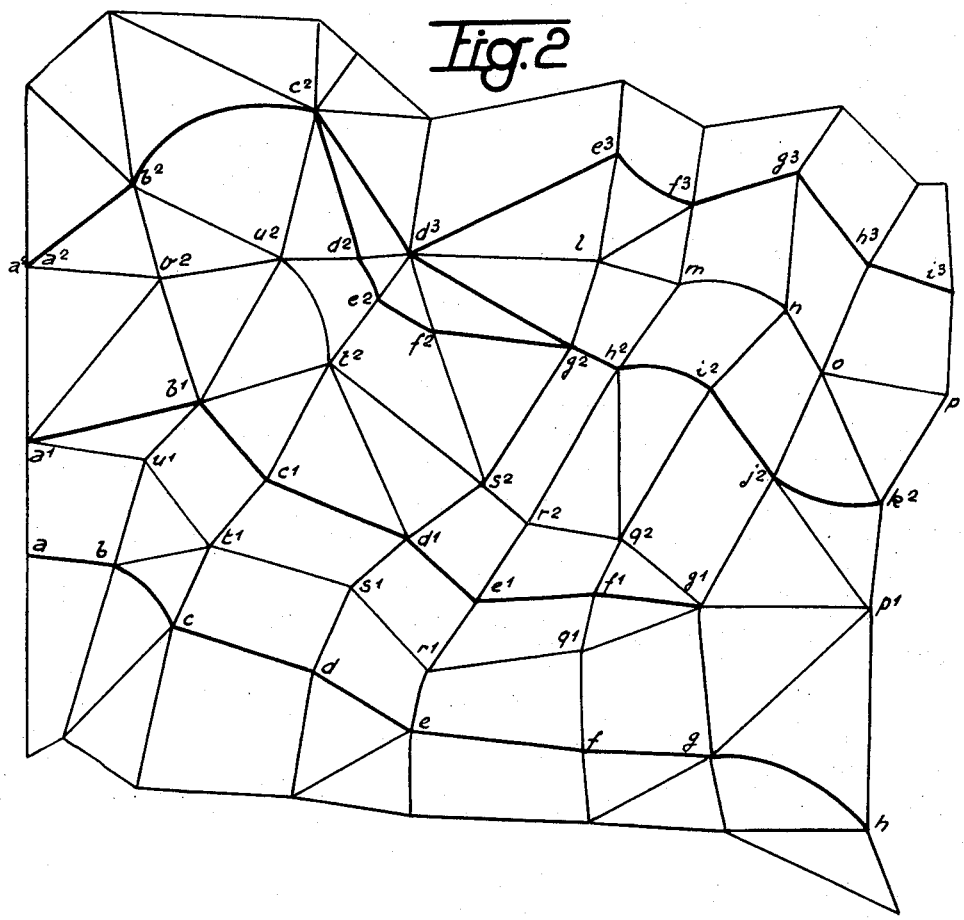
FIG. 2 shows the same structure when developed on a plane.

When positioned side by side, all the edges adjacent the elementary surfaces thus developed coincide as shown in FIG. 2. As a matter of fact, each of the different ridge lines forming each both the edge of one elementary surface and the corresponding edge of the adjacent elementary surface cannot, when spread in a common plane, provide anything else except the final developed surface referred to, since it has been assumed by way of a definition that the different successive angles defining the first edge are precisely the complement with reference to 360° of the corresponding angles of the same magnitude forming the second edge.

It is important to remark at this point that the different points of convergence between the ridge lines and the folds or bending lines define in all cases at least four angles belonging to at least as many separate adjacent elementary surfaces.

The solids with very small thickness or the surfaces which form the object of my invention as defined hereinabove, are consequently, in spite of their chevron structure which may apparently be very intricate, of a substantial simple structure since they are always developable on a plane. This property may be considered as inherent to the thick solid structures forming also the object of my invention, at least inasmuch as their deformability or malleability is sufficient for them to provide when flattened out in the thickness considered, a straightening of the bent and folded sections of the structure and of the ridge lines. When developed, the thick structure of such solids is that of a mere sheet of a material retaining the original thickness with the allowance to be made for a few deformations arising through imperfect straightening operations.

The above remarks show that any very thin chevron structure, or the thickness of which allows, taking into account the nature of the substance forming the structure, an accurate development on a plane, may be flattened through a mere straightening of the warped surfaces, ridges and folds. During the flattening out of the structure, the height of the latter is gradually reduced at all points; as a counterpart, the structure occupies a surface which increases at the same time in an uninterrupted manner both as to breadth and to length, said increase being however generally non-uniform.

The outer geometrical outline of any chevron structure when flattened out is thus defined by the joining outlines drawn on a plane at a scale of 1/1 and in suitable sequence of the different elementary surfaces forming it; the compound outline thus obtained defines furthermore throughout its extent the exact location of all the straight or curvilinear folds which, when executed simultaneously with the suitable degree of folding, allow re-forming the original structure.

From the preceding disclosure, it appears naturally that the basic method which allows forming a predetermined chevron structure whatever it may be is obvious. As a matter of fact, it is sufficient to draw on a sheet of the substance to be used the different elementary surfaces forming the compound outline of a predetermined structure, and then to fold the sheet in the desired directions along the lines thus drawn, said folds being gradually made more marked throughout the extent of the sheet. Since the chevron structures are to satisfy predetermined requirements of the applications to be considered, the shape of the different elements thereof should be designed and executed in accordance with said requirements. It is necessary to proceed through successive empiric steps or else to rely on suitable mathematical calculations.

Finally the outlines obtained allows folding the sheet into the desired structural shape.

In practice any joining outline for the different three and four sided elementary figures, having at least two straight sides opposed to each other, i.e. triangles or four-sided members having curvilinear sides or otherwise, is generally adapted to be folded in the shape of a chevron structure. It is however necessary for all the points of convergence of the ridge lines, of the folds or bending lines to form for the reasons disclosed hereinabove the ends of four independent lines at least.

The reproduction of an outline may then be executed through any suitable means such as a printing press, a press provided with a marking tool, or else through photographic processes and the like.

Before proceeding with the chevron folding of a suitably outlined structure, it is necessary to select in any suitable manner, among the different lines, those lines and bundles of lines wihch are adapted to form the ridges of the structures to be established, provided however the selected lines include of necessity all the incurved lines since the folds or bending lines cannot include such incurved lines and must in all cases be straight.

Generally speaking, the general outline thus resorted to should now be completed. It is important to draw as a matter of fact, between the successive ridge lines, folds or bending lines as required by the definition of the present invention and which might not be present in said general outline.

During the folding into chevron shape of an outline of this type the parts of which may be widely different, it should be remembered that all the elementary surfaces are shifted simultaneously out of the plane of the original sheet and that some of these elementary surfaces will rise more steeply than others. These particular surfaces in fact will move nearer the elementary surfaces facing them at a higher rate than others. There arrives consequently a moment at which during the formation of the different folds throughout the extent of the structure which is being executed, two predetermined surfaces, turning round their common side along which said surfaces engage each other before other surfaces, come thus into contact. The two planes forming said elementary surfaces, or tangent thereto if they are curvilinear, are then merged into one another.

At such particular points and only at such points, any increase in the folding becomes impossible, whereas nothing similar occurs at the other points of the structure. However, the interdependence between the different surfaces considered prevents the chevron folding of the outlined sheet from continuing any further. There is thus obtained at this moment a locking of the structure.

The chevron folding of somewhat intricately outlined sheets is always limited in its progression through such a locking. This is moreover the case of all outlined sheets even when comparatively simple but wherein a certain lack of symmetry prevents a corresponding progression in the folding of all the elementary figures drawn thereon.

Among the simpler outlines which may generally be folded into chevrons having joining folds throughout their extent, I may mention those which are constituted of a very small number of different figures repeated uniformly such as parallelograms, trapeziums, triangles and the like. These outlines lead to the obtention of the structures which are the easiest to be obtained through mechanical means and they are also those which may be used more generally.

The most characteristic particular structure of this type (FIG. 3) is that which is constituted exclusively by series of two symmetrical similar parallelograms. The developed flat outline leading to the execution of such a structure (FIG. 4) produces flanks or parallel rows of identical elementary surfaces separated by equidistant broken ridge lines bounding similar elementary surfaces and forming with one another equal angles; such a structure which, by reason of its symmetrical arrangement, is foldable into chevrons with joining folds, present at all stages of its gradual formation two outer flat parallel enclosing surfaces. The distance between said two enclosing surfaces which passes during said formation from the plane of the original outline to the height of the parallelogram extending between the ridge elements depends obviously at every moment on the extent of folding of the structure.

Figure 25:
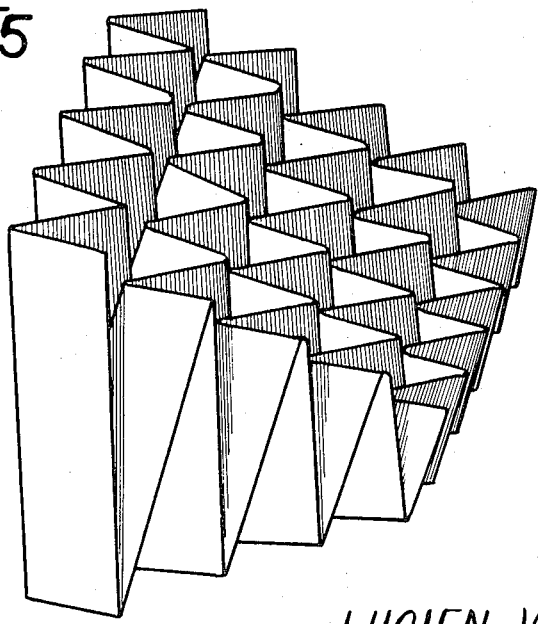
FIG. 25 is a perspective view of a chevron structure of a particular type adapted to be obtained through the operation of a machine similar to that illustrated in FIGS. 16 and 17 according to the second method.

When the parallelograms forming such a structure are equal only for each of the successive rows, the preceding disclosure is true only between two successive rows. In this case, the outer enclosing surfaces include as many successive parallel planes as there are different heights for the parallelograms (FIG. 25).

If in the description, I resort no longer to a single type of parallelogram, but to different parallelograms having equal acute angles and the same height but different breadths, said parallelograms being associated in joining relationship with symmetrical parallelograms, the structure formed shows the same characteristics as to parallelism as the precedingly described structure. Only its outer appearance shows the lack of equality between its component members.

When, in addition to differences as in breadth, the acute angles are also different, nothing is altered in the general features of the structure. However, the irregularities in the angles lead to a locking during the folding procedure so that the structure cannot be folded into chevrons with joining folds.

When, throughout the length of each of the elementary surfaces of a structure, the successive parallelograms have the same height and the same breadth while their acute angles differ from one parallelogram to another, said angle increasing first and then decreasing and this repeatedly in a continuous manner to either side of each of the ridge lines, the different parallel broken ridge lines which are all similar to one another have a generally sinuous shape.

Figure 5:
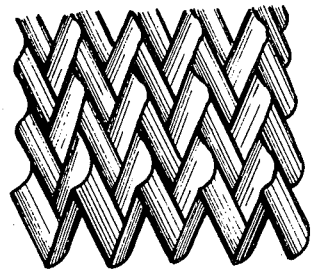
FIG. 5 illustrates a chevron structure the ridges of which have an undulating shape.

A limiting case is reached when the parallelograms are so narrow that their breadth becomes negligible. This leads to a family of structures of an undulating type as shown in FIG. 5, which are remarkable through the fact that the folds in the flanks connecting together the apices of the ridge lines disappear and are replaced by bending lines defining their changes in curvature. The two outer surfaces of such structures are plane and parallel when the ridge lines are equidistant while they are stepped in echelon in the general case. The bending lines of the flanks define the locking points of such structures.

In the case of such an undulating structure, as is the case with all of the structures of the present invention, the ruled elementary surfaces forming the walls of the protrusions and recesses of the sheet join one another along lines having points at which they change direction and at each of which points border lines of at least four of said elementary surfaces converge, the sum of the angles formed on said surfaces between said border lines at each of said points being equal to 360°. In the structures having flat surfaces, the presence of the four converging border lines is readily apparent. In the undulating structures, this feature is also clearly present, the border lines of the elementary surfaces which converge at each of the points on the undulating ridge lines being constituted by the generating lines of each pair of surfaces merging to form a ridge line, together with the half-tangent line of each side of the point of tangency of a line drawn tangent to the ridge line at each of said points.

Figure 6:
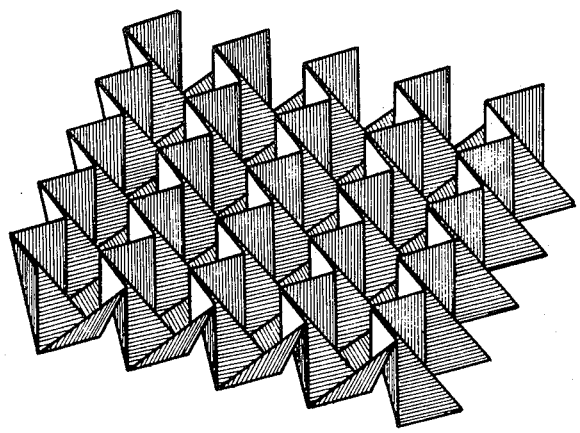
FIG. 6 illustrates a solid structure the elementary surfaces of which include exclusively triangles of two different shapes and further triangles symmetrical with reference to the latter.
Figure 7:
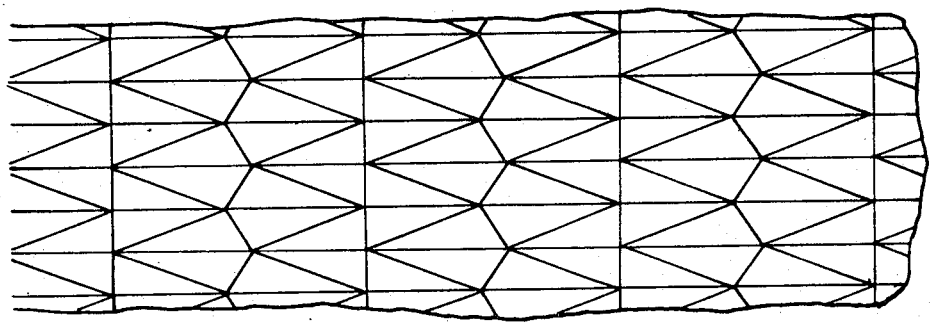
FIG. 7 shows the solid structure of FIG. 5 developed on a plane.

By associating in the flat outline triangles of two different but similar types and their symmetrical counterparts, it is possible to constitute chevron structures which are somewhat more intricate than those described hereinabove while their applications are quite remarkable (see FIGS. 6 and 7).

The substitution for such folded ridge lines in such outlines, of undulating lines allows obtaining structures which present with reference to those which have been heretofore defined differences similar to those mentioned hereinabove as far as parallelograms are concerned.

Within the limited scope of the present disclosure, it is impossible to describe all the groups of structures falling within the general definition set forth hereinabove and claimed in the accompanying claims. It should be mentioned however that the ridge lines are not of necessity parallel with one another. In the case where these lines converge the structures are circular. Their boundary surfaces are then constituted by conical surfaces which are simple or multiple according as to whether the spacings between the ridge lines are equal or otherwise.

Whatever may be the configuration of a predetermined structure, it is always possible to substitute for one or more ridge lines, one or more bundles of lines, provided however one remains within the scope of the above referred to definition. As a matter of fact, it is sufficient to turn inwardly, partly or totally, a number of the convex sections of the ridge lines formed by such a structure by proceeding with a depression of each of them between the elementry boundary surfaces so as to transform said sections into as many concave lines bounding two transformed surfaces constituted by the material of the former elementary surfaces whereby two further intermediate convex ridge lines are obtained. Each further ridge bundle thus produced increases the number of flanks constituted by lateral elementary surfaces, while reducing to a certain extent at the points considered, the distance between the enclosing surfaces.

Figure 8:
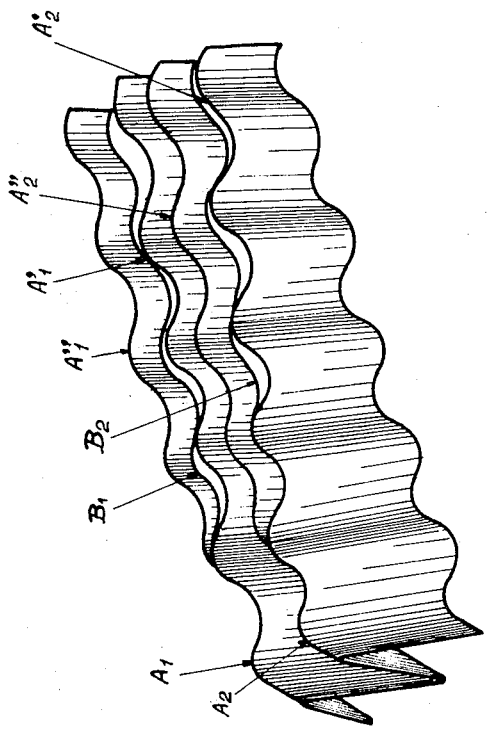
FIG. 8 shows a structure similar to that of FIG. 5, but in which certain undulating ridges have had their positions reversed.

By combining all or part of the means falling within the scope of my invention as claimed in the accompanying claims, which means have also been defined hereinabove, it is apparent that while resorting only to one very simple type of embodiment of chevron structures such as that which allows producing undulating configurations, it is always possible to produce a solid structure adapted to fill with the desired accuracy a predetermined space even of a complex nature bounded for instance between any two ruled surfaces or between any two incurved surfaces (FIG. 8). It is sufficient to resort, to this end, when executing the desired outline of a flat sheet, to the expedient provided by the modifications in the distances between the flanks, the subdivision of the ridge lines into bundles and possibly the incorporation of suitable folds and bending lines, so as to modify as required any simple structure the elementary surfaces of which are flat and parallel while the detail of the structure is brought to the desired final shape. In the example illustrated in FIG. 8, which illustrates a chevron structure, similar to that illustrated in FIG. 5 but with modification, it is apparent that the convex ridge lines $A_1$, $A_2$ have been depressed over a part of their length which leads to the formation of concave ridge lines $B_1$, $B_2$ comprised respectively between two further convex ridge lines as shown at $A'^1 A''^1$ and $A'^2 A''^2$, which leads to modifications in the distance between the surfaces enclosing the two sides of the structure.

All the chevron structure which it is possible to produce, whatever may be their design, whether simple or otherwise are essentially deformable, since the folds provide their own yieldingness for cooperation with the deformability or malleability inherent to the sheet material forming said structure. For any structure, the importance of the possible local deformations varies however to a considerable extent, in accordance with the areas to be considered, as provided by the number, the importance and the arrangement of the lines and elementary surfaces to be considered in said area; the structure which have the simplest constitution and which are the most homogeneous are those wherein the possibilities of deformation are distributed in the most uniform manner. Such structures may very readily mate with the surfaces on which they are to rest.

In all cases, it is an easy matter to increase to a very large extent the yielding or resilient character of any predetermined structure, solely by closing its folds as much as possible; the structures which are liable to be locked such as the corrugated or undulating structures for instance, lose naturally much of their original yielding character as the chevron folding approaches the locking point.

Chevron structures according to the present invention offer a very high resistance to the loads transmitted, locally or otherwise, between the two large enclosing surfaces of the structure.

The flanks or series of elementary surfaces bounded by the ridges are as a matter of fact braced with reference to one another in an uninterrupted manner so as to balance and to absorb the sliding components acting perpendicularly to the stresses applied to the structure. The numerous folds and bending lines extending across said flanks form between successive ridge lines, angularly shaped or curvilinear stiffening members preventing any buckling throughout their extent.

The flanks behave thus as so many rigid stays securely anchored between the enclosing surfaces. Simple and symmetrical structures which are enclosed between two flat parallel surfaces are those which provide the highest resistance to crushing loads, chiefly when their flanks are undulating, because they are remarkably homogenous and any desired number of folds may be closed along sloping planes as near to the direction of the stresses to be resisted as may be considered necessary.

I have thus defined the more salient properties of chevron structures. These explanations provide understanding of how the different substances used for forming such structures require, during the chevron folding operation, novel properties which are generally associated with those normally shown by them at the start. These supplementary properties are the following in the case of a chevron structure with close folds:

A large superficial extent for the amount of substance housed with in a reduced enclosing volume.

A very large elasticity in the bearing of all the ridges of the structure throughout the extent of the enclosing surfaces.

A high resistance against crushing since said resistance is that of the actual solid material when the folds join one another.

A practically unvarying height between the two bearing surfaces in spite of the modifications which may occur simultaneously throughout the breadth and the length of the structure.

Or in other words:

A large range of possible modifications in breadth and in height for a practically unvariable height between the two outer enclosing surfaces, A complete lack of response to the action of expansion produced by heat in the direction of the length and of the breadth of the two outer surfaces.

Each of the properties of the chevron structures defined hereinabove loses its value to a certain extent when the folds open more widely with reference to one another. In contradistinction, when said folds are spread out or released, a novel property which is a light weight, is obtained and develops. The specific weight of a structure which is, when the folds lie in joining relationship, exactly that of the material forming them decreases proportionally in an obvious manner when the volume increases. This specific weight is, for its lowest value, equal to an always very low figure when the structure reaches its maximum volume. Beyond this predetermined position of the opening of the folds, the structure loses some of its volume and the value of the specific weight increases. Finally, when the sheet is spread out or developed again over a flat surface, the specific weight is again that of the original solid material.

The most favorable compromise to be found between the first mentioned properties and the last i.e. a reduced weight, taking also into account the cost price of the whole arrangement, allows defining for a predetermined type of substance the more or less considerable opening of the folds to be provided so as to satisfy fully the requirements of the applications to be considered.

The principal applications of the chevron structures according to the present invention are chiefly and according to the substances used, as follows: paper, fabric, felt, filtering metal gauzes, porous substances such as ceramic ware, when provided with chevrons having joining folds or at least close folds are adapted to produce filtering layers and filtering elements of any sizes, as required for the purification of all liquids and gases and in particular for removing the the dust from air.

Metal sheets such as steel sheets when formed with chevrons having loose folds, allow producing sheets which are more yielding than corrugated metal sheets and which may be used as such for covering roofs and coating the walls and floors of sheds, houses and the like, or else they may be worked into the shape of central heating radiators, heat exchangers and pressure transmitters, thermostatic casing or compressor diaphragms.

These chevron-shaped elements which may be made of a substance different from metal such as paper, fabric, plastic material, glass, plaster of Paris, cement, agglomerated material or the like, are also applicable for the ornamental coating of walls, cellings etc. in halls, theaters and the like or even in the rooms of private residences.

The manufacture of paper, cardboard, plastic material and the like in chevron shape adapted for those uses for which corrugated paper and cardboard are used for packing and the like purposes; even in the case of considerable thickness, forms one of the most interesting applications of the invention since the resistance to crushing of said material when so formed in chevron structure is, for an equal weight of material, several times higher than that of the conventional materials provided with a mere corrugation.

A further very important application is that which relates to the execution of the network elements as resorted to for the so-called sandwich material provided with recesses or cells within its body. Sandwich materials are well known in the art and essentially comprise spaced opposed cover sheets or skins having interposed between them a core sheet which is bonded to the cover sheets to form an integral structure. Such structure is formed by bonding the crest ridges of the chevron cores of the present application to one of the cover sheets or skins and by bonding the valley ridges of such cores to the spaced, opposed cover sheet or skin. Viewing the core material of FIG. 3 as part of a sandwich structure, for example, the ultimate structure would contain a core sheet having corrugations extending in zig-zag parallel rows from one side to the opposite side of the sandwich structure with each corrugation having crest ridges secured to one cover sheet and valley ridges secured to the other cover sheet, said ridges terminating in peaked edges and said corrugations having inclined planar side walls between the crest and valley ridges. Quite obviously, the corrugations of such a sandwich structure will necessarily define flow passages through the structure as fabricated.

Chevron structures of the foregoing type forming plates of any desired substance or preferably of any combination of substances including, according to the case, paper, plastic material, agglomerated material, glass, cement, plaster of Paris, metal sheet and the like, etc., show, when compared with similar conventional materials, and in addition to a lighter weight and a more considerable rigidity in shape, much more marked insulating properties with respect to sound vibrations and heat (through radiation and conductivity) which are much more considerable and are associated with an extremely low cost price.

In the building industry, sandwich chevron-plates may serve for executing partitions, ceilings, roofs, walls, prefabricated panels for houses, structural blocks and the like.

In the case of joiner's work, the improved chevron structures, chiefly sandwich plates may serve for executing thick panels, hollow elements for pieces of furniture, light and rigid doors, imitation thick plywood of any type.

The partitions and floors in ships, railway compartments, telephone booths, aircraft cockpits, are advantageously executed with such chevron plates whether flat or incurved.

The filling of the wings, fins and incurved connecting elements for aircrafts and certain light buildings may also be executed easily and at a low cost price through the use of my chevron structures.

The chevron shaping of yielding substances such as rubber and plastic material in a solid or cellular or spongy state produces yielding and resisting elements and blocks which allow forming cushions, seats, mattresses, yielding carpets, antivibrating supports for machines, yielding diaphragms of any type and deformable fluid-tight casings.

The means which are the most suitable for ensuring the manufacture of material shaped in accordance with my invention are selected, taking into account the configuration of the structures to be executed and the nature of the substance forming them and also the state in which the substance is used.

In the case of chevron structures of a uniform thickness which are to be executed with a substance having a sufficient deformability or malleability and formed in sheets having the desired thickness, it has been mentioned already that in accordance with a first method of production the structure is executed gradually progressively by hand in conformity with a previously drawn line, this operation being performed throughout the extent of the sheet, care being taken to fold the sheet in the desired alternating directions. This method is applicable to the execution of all types of chevron structures, whatever may be the complexity of their configuration, provided however that the substance selected may be brought first into the shape of sheets which are deformable or malleable when assuming the required thickness, said substance being then used in said sheet form.

There is available a second method, in the case of substances which are more easily obtainable in other shapes or which are not malleable in substantial thicknesses, such as plaster of Paris, cement, plastic material, agglomerated material, ceramic ware, cellulosic substances, metals and the like, for which it is often of advantage to proceed through casting or molding at a suitable temperature and under a suitable pressure between the two halves of a mold. Certain substances such as rubber are necessarily treated in accordance with this method.

It should be remarked that the different components of said structures may be molded in a very efficient manner because, considered as a whole, taking no account of certain details of intricate structures, the raising of said structure is obtained perfectly by reason of the oblique position of the flanks extending along the ridge lines.

The mold components should be executed by means of substances suiting the molding methods employed, i.e. generally plaster of Paris in the case of the molding of plaster of Paris, cement, pottery slip, etc., or else metal when molding plastic material and rubber or again wire net or the like for washers containing cellulosic fibres to be laid in position or sand for molten metals, etc.

The execution of mold elements which normally would be intricate and costly by reason of the difficulties of machining arising through the intricacy and interengaging configuration of the flanks along the ridge lines, may in practice be executed very simply in most cases, since it is sufficient to proceed, with a view to obtaining them accurately, by molding structures forming patterns, which have been previously made by hand in the desired shape by resorting for instance to strong paper or thin metal covered if required with varnish or plastic material.

The various methods of casting or molding considered will allow producing easily all chevron structures having two bounding surfaces remaining at equal distances from each other or otherwise, and also massive chevron structures of any type bounded by one or more bounding surfaces of any shape whatever.

Chevron structures executed through molding in the manner disclosed hereinafter are in conformity with the structures defined hereinabove since the molding reproduces strictly all the details in shape of the developable structures forming the patterns.

However, I may resort to the fact that the molds thus produced may be readily modified as concerns the details of their shapes with a view to giving the solid structures formed certain further convenient or useful features or properties. Thus the thickness of the material may be no longer uniform but it may be reinforced at certain points, if required for instance through the use of ribs fitted over the flanks so as to give the structure a greater local rigidity or a greater resistance. The angles may be rounded and the ridges less sharp. In certain cases, it may be desired to incorporate into the basic chevron structure hooking, positioning and the like elements without unduly widening thereby the scope of my invention as defined in the accompanying claims.

When providing for mass production of thin chevron structures of a simple configuration and when it is possible to resort to this end to deformable or malleable substances which may be obtained chiefly in the shape of sheets, it is of advantage to resort to one of the following mechanical production methods:

(a) Folding into chevron shape through the intrusion of the different surface elements forming the successive flanks along the ridge lines drawn on a continuous plane sheet between two jaw systems adapted to assume a receding motion which may include progressive increase of chevron pitch.

(b) Forming into chevron shape by reversing in one flank out of two the longitudinal folds of a sheet fed in a continuous manner.

The first-mentioned method of the mechanical folding into chevrons through engagement of the successive surface elements of a continuous sheet between two jaws, resorts to the possible local deformation of any chevron structure of a reduced thickness and more particularly to the possibility of drawing out superficially such a structure across the flanks for instance. As a limit, it should be remarked that such a structure held in its original shape at one of its ends, may be completely stretched or drawn out or developed on a flat surface at its other end.

Figure 9:
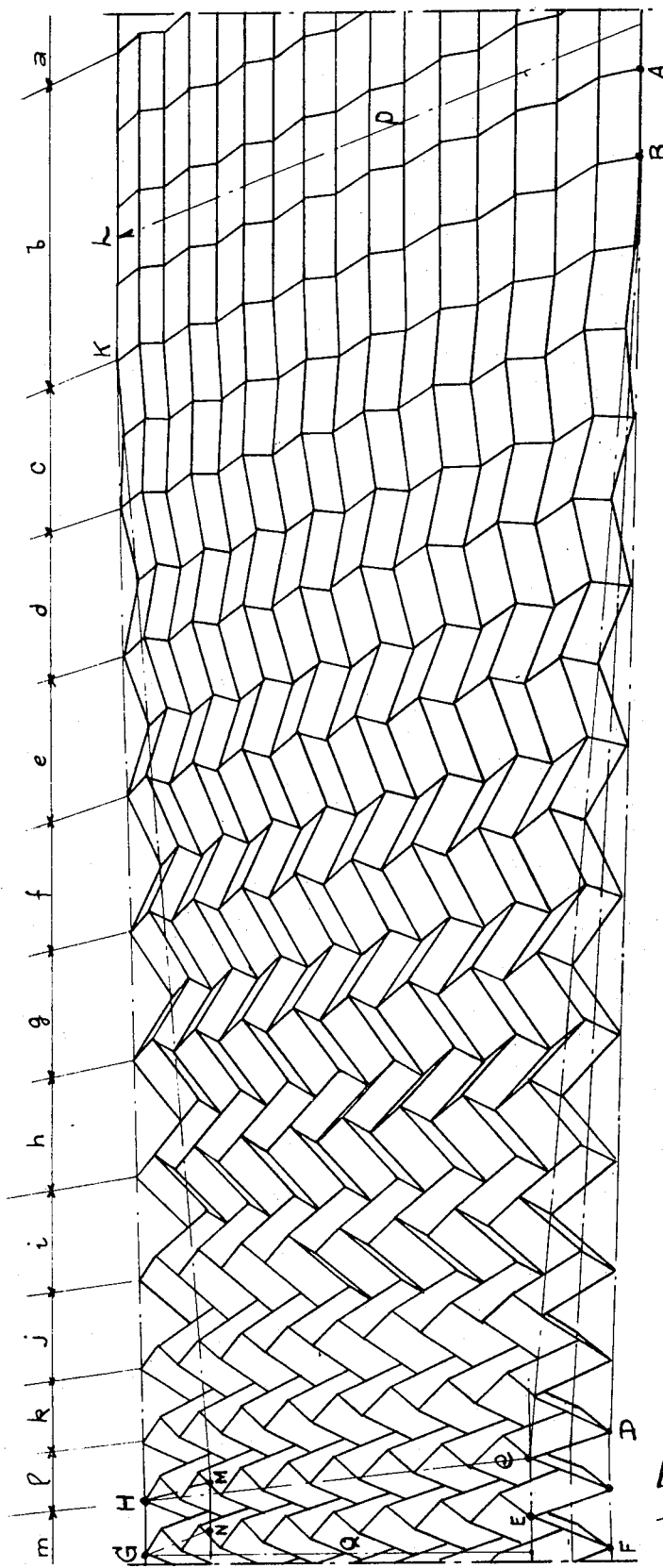
FIG. 9 is a perspective view of a portion of a chevron structure similar to that shown in FIG. 3 as it appears during the progressive formation of its component elements.

FIG. 9 shows a chevron structure thus drawn out according to the first method and comprising exclusively a predetermined parallelogram shape and a symmetrical parallelogram. This figure shows how it is possible conversely to pass gradually, imperceptibly and continuously from a flat shape to the final chevron shape.

The sheet is flat in the area $a$. In the area $b$, it is provided with two lines of folds to be made later on to form the ridges. In the area $c$, the first folding or pleating is initiated. In the area $d$, the pleating is more marked and this continues gradually progressively in the areas $e$, $f$, $g$. etc. up to $l$ which defines the last groove beyond which the formation of the chevrons in the area $m$ is submitted to its maximum final shaping.

At $a$, the sheet is flat; starting from $c$, it is pleated and defines two limit surfaces C H K B and D M K B which are oblique with reference to each other and are located to either side of the original plane of the sheet forming the structure. In the area $m$ and beyond the same, the surfaces F N M D and E G H C enclosing the plate provided with its complete chevron structure are parallel.

During the pleating or folding, the sheet having a breadth P at the start narrows gradually as the pleating is continued. At $m$, the chevron plate has only a breadth Q which is a fraction of the original breadth P. It will be readily understood that this breadth Q is reduced all the more when the pleating is more marked. At the limit and for a sheet which is theoretically of zero thickness, the breadth Q would be also equal to zero.

A machine for producing a chevron structure in accordance with the first method which has been described with reference to FIG. 9, is illustrated diagrammatically in FIGS. 10 to 15. In said machine, the sheet to be pleated or folded enters in the direction of the arrow F (FIG. 10) between the two cooperating oblique embossing jaw bodies 1 and 2 provided with as many movable dies as there are groups of say four adjacent parallelograms. Dies such as 3 and 4 are fitted together in each embossing plane in rows for each groove and also in longitudinal alignment. These dies which are closely fitted in adjacent relationship assume together the accurate shape to be given to the sheet during the folding step already described with reference to FIG. 9.

This system of two embosisng jaws is supplemented on the rear i.e. on the side feeding the paper, by the incorporation of two bars 5 and 6 adapted to mark the folds in the flat sheet, which may be obtained through annealing for certain substances such as metals; behind these bars are two independent clamping bars 7 and 8 while there is provided to the front of the machine and facing the finished plate a bolt 9 adapted to engage one of the grooves of the chevron structure as it passes out of the shaping means just described.

At the beginning of the shaping cycle (FIG. 10), the two embossing surfaces of the machine are in complete contacting relationship, the different dies being closed towards the front and being fitted exactly inside one another taking into account the thickness of the sheet held between them. The sheet assumes thus mechanically at this moment the shape given to it by the dies i.e. the optimum shape for gradual folding (FIG. 9). However, in practice each of the folds has been submitted at the end of the preceding clamping stroke to an elastic deformation which is not negligible and which produces a substantial general relaxation at the moment of the release of the dies.

Taking into account the preceding disclosure, the following movements are obtained (FIG. 11) starting from the position illustrated in FIG. 10.

The rear bars 7 and 8 clamping the sheet are fastened over the unimpressed section of the sheet and the bolt 9 sinks into a finished groove.

The embossing surfaces 1 and 2 move apart gradually and the same is the case for the marking bars 5 and 6; during this opening movement the dies and the bars 5 and 6 recede laterally (FIG. 11) while the clamping bars 7 and 8 move rearwardly by an amount at least equal to that by which the sheet expands.

At the end of the stroke (FIG. 12), the embossing surfaces 1 and 2 open apart to a maximum. Since each row of dies has moved rearwardly by one groove interval, it is then located exactly above the group of parallelograms preceding that formed by its precedingly. The marking bars 5 and 6 are in their turn positioned accurately above the next section of sheet to be engaged between the jaws.

Without the dies or marking bars moving any more, the embossing jaws 1 and 2 move towards each other to a sufficient extent for the tips of the dies to just come into contact with the corresponding hollows of the sheet. In contradistinction, the marking bars 5 and 6 have become operative during this stage and mark in the sheet the lines defining the future folds. The position reached is that illustrated in FIG. 13 when the two clamping bars 7 and 8 are released and the bolt 9 has risen.

The marking bars 5 and 6 begin then their gradual forward movement and carry along with them the unimpressed sheet. Their part consists chiefly in urging forwardly, through the free spaces left by the dies which close in the three directions of space with reference to each other, the sections of the sheet which are submitted to a gradual progressive folding procedure. During this progression of the bars, each row of dies progresses positively under the action of a lever system described hereinafter at the desired speed and through the suitable distance, said speed and distance being more coniderable when the row of dies considered is nearer the rear end of the sheet.

At the same time, the two fastening bars 7 and 8 which are always open, return into their foremost location. The system has thus returned into the position illustrated in FIG. 10. During the cycle of operations which has just been completed or described, a groove of the chevron structure has been released and a further area of the sheet has entered the jaws. The cycle of operation may now be repeated.

It is important to remark that the above described machine exerts preferably no embossing or stamping or forming stress. The embossing jaws 1 and 2 and the dies provided thereon form only inert molds between which the sheet to be shaped is introduced gradually and against which it bears during the folding procedure. The useful driving stresses is exerted solely by the marking bars 5 and 6 pushing in front of them through intrusion and in sequence the successive sheet areas which are to form further folds.

Of course, the lengths of the different rows of dies vary between the whole breadth of the sheet at the rear and the breadth of the chevron structure to the front.

Figure 15:
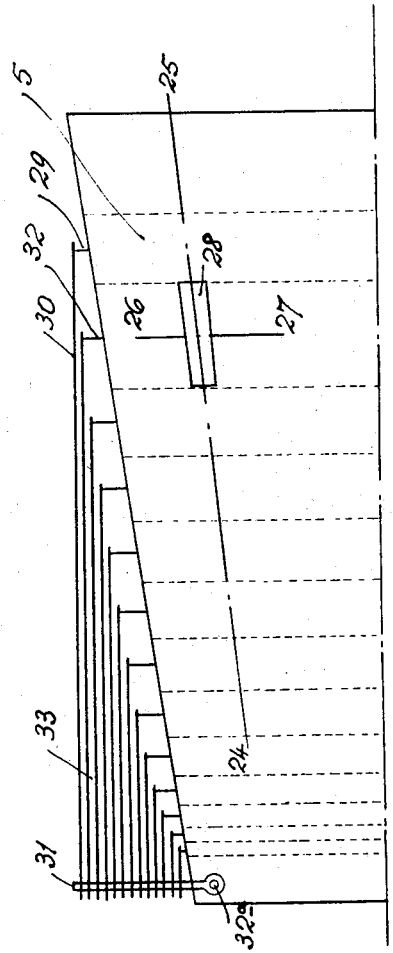

FIGS. 14 and 15 are diagrammatic elevational and plan views of one of the numerous control means which may serve for controlling the above described movable parts. The two embossing jaw bodies 1 and 2 over which the dies such as 3 and 4 are adapted to move, are held in front of each other and clamped together by means of a double set of guides and springs 10, 11 and 12, 13 provided laterally. The two embossing surfaces may be shifted away from each other by acting on two points on the side of each of their front and rear ends through the agency of cams 14 and 14' actuated by levers 15 and 16 and by pusher members 17 and 18 controlled in their turn by master cams 19 and 20 fixedly attached to the driving shaft 21.

The dies such as 3 and 4 are adapted to move in parallelism with the planes of the corresponding bodies 1 and 2 while the two marking bars 5 and 6 follow in contradistinction the mean horizontal plane of the sheet. To this end, the frame carrying the two embossing jaws carry suitable lateral slideways 22, 23, which guide the bars 5 and 6 and carry them along with them through their ends, while leaving a certain freedom for said bars in a vertical direction so that their clamping may be provided slightly before the clamping of the embossing jaws.

The above description shows that each die should move in the three directions of space during the time required for the progression of the bars 5 and 6. To this end, the dies are held in contact with the jaw bodies 1 and 2, by longitudinal guiding rods or slideways, the axes of which are projected in plan view as shown in FIG. 15 on lines such as 24, 25 and 26, 27 in the case of the particular die 28, which is the only one illustrated. The slideways such as 24, 25, are stationary with reference to the planes of the jaw bodies 1 and 2 while the rods such as 26, 27, providing for the alignment of the rows of dies are movable. The dies driven by said rods slide over the slideways along the jaw bodies 1 or 2.

The driving of the rows of dies may be executed in various manners. The simplest is illustrated in FIG. 15 which is a half plan view of the embossing jaw 1. The bar 5 carrying at each end a rod 29 is connected through a blade 30 with a lever 31 pivotally secured to the point 32a. Similarly the end 32 of the rods 26 and 27 corresponding to each row of dies is connected through a blade 33 with the same lever 31. Thus, all the movements of the marking bar 5 are associated accurately with similar movements of different rods such as 26, 27 connecting the dies, but the speed and length of travel of the different parts is at any moment proportional to the distances between the points at which the blades are pivotally secured to the lever 31 and the pivotal connection 32 respectively. A similar arrangement is obviously provided also for the embossing jaw body 2.

This satisfies the multiple cooperating conditions governing the movements imparted to the bars and dies as disclosed hereinabove.

In FIG. 14, there is shown a lever 34 which urges forwardly and withdraws then rearwardly in alternation, the associated bars 5 and 6 so as to ensure equally the shifting of all the dies. It is actuated also by the master cam 35 mounted on the driving shaft through the agency of the pusher member 36.

The clamping bars 7 and 8 which are to be tightened and also to be shifted longitudinally are carried by lateral slideways 37 and 38 pivotally secured at 39 to each other. To either side of the arrangement, a cam 40 controlled also by a master cam keyed to the driving shaft 21, produces through cooperating pusher members the opening and the closing of said slideways 37 and 38. Two springs 41 and 42 transmit to said clamping bars 7 and 8 the required compressing stress. The shifting of said bars is performed by means of a lateral lever 43 which also receives its movement through a cam mounted on the driving shaft 21.

Lastly, the pivoting bolt 9 at the front is controlled similarly on each side by a lever and a rod driven similarly by a cam fixedly attached to the driving shaft 21.

The machine thus described is obviously disclosed only by way of exemplification and the arrangements to be provided in each case depend obviously to a large extent on the type and characteristic properties of the substance forming the sheet to be worked. It may be of advantage in particular to omit the clamping bars 7 and 8 and the bolt 9 (FIGS. 10 to 13) and to make the rising movements of the different rows of dies independent from one another.

The different rows of dies in such a machine of FIG. 14 according to the first method are thus not rigid with the embossing jaw bodies. When it is desired to progress by a one groove interval before the dies reengage for a folding step, the rows of dies rise individually and in succession from the rear to the front while the other rows of dies continue holding the sheet which is being folded.

The chevron folding through reversal of longitudinal folds in one flank out of two in accordance with the second method referred to hereinabove, requires mechanical means adapted to locally turn round in successive transverse sections the molds for a sheet of substance which has been previously folded or corrugated in a longitudinal direction. A machine executing such a reversal method includes therefore in principle two well defined separate sections. The first section is equipped with a roll of the substance as sold in trade; it includes the mechanisms required for corrugating or folding the sheet which is to be provided continuously with chevrons in a longitudinal direction. The second section of the machine includes the mechanism which are to produce the desired alternating transverse reversal of the folds of corrugation of the sheet.

FIGS. 16 and 17 show diagrammatically the main members of such a machine. The sheet to be shaped 45 winds off the roll 44 and after a certain travel forms an abrupt bend at R and it then enters in flat formation inside a harrow arrangement 46–46' providing for its gradual progressive folding.

The sheet, longitudinally corrugated and folded by the arrangement 46–46', passes out of same at S where its shape corresponds more or less accurately with that of either type of flank which it is desired to produce for the chevron structure. This shape is more or less exactly the reverse of the shape of the second type of flank. The breadth of the corrugated sheet at S is consequently already that of the final chevron structure to be obtained.

The folding arrangement includes two harrows 46 and 46' constituted each by as many longitudinal blades as there should be folds or corrugations in the sheet. The blades are arranged so as to converge and thus take into account the reduction in breadth imparted gradually progressively to the sheet.

The blades of the harrow 46 and also of the harrow 46' are arranged at R in a manner such as to leave between them exactly the interval required for the passage therethrough of the sheet in flat formation. At S in contradistinction i.e. at the output end, said harrow blades interengage by an amount adapted to give the sheet the desired shape.

The convergence of the harrow blades constrains one to feed the sheet at R in arcuate formation. This is provided by the bending of said sheet at R. At this point R, the sheet turns round a tore shaped cylinder or concavely grooved pulley 47 having as its axis $xx'$. Through this contrivance, the sheet unwinding in flat formation from the roll 44 assumes a shape which is more and more incurved and which matches finally that of the cylinder having axis $x$–$x'$. The sheet turns round the latter through an angle approximating 90° and it assumes again between the harrows 46 and 46' a plane shape, but this time between convergent sides.

In practice, the unwinding of the sheet from the roll 44 and the rotation of the tore-shaped cylinder or pulley 47 should be controlled mechanically in a manner such that the sheet 45 may be subjected in register with the axis $x$–$x'$ to no substantial tractional stress. Similarly, the energy required for the shaping of the sheet between the harrows 46 and 46' cannot, by reason of the high value of the friction between the sheet and the harrow blades, be derived from the tractional stress exerted by the second section of the machine. It is therefore necessary to mechanically actuate the harrows in the vicinity of the output end S by communicating thereto a reciprocating movement towards and away from an optimum point, the amplitude of said reciprocation being very small and its frequency high. It is possible to resort to this end to a mechanical, electro-magnetic or the like vibrator, provided however the driving unit selected has a sufficient power.

The tore-shaped cylinder 47 may be constituted by a yielding shaft carried at its ends in bearings. It may as well include a plurality of cardan joints. Independent rollers carried by a stationary curvilinear shaft may also be suitable, provided they are rigidly interconnected for synchronous rotation.

The shaped sheet arriving at the delivery point S engages then the gap between four transverse movable bars 48–48' and 49–49', the mechanical design and shape of which are such that when they are brought near each other they fill up accurately four successive transverse recesses formed in the chevron structure during its being formed. The sheet first engages the gap between the two first bars 48–48' forming cooperating jaws. At the beginning of the operative cycle of the machine, said two bars engage each other tightly while holding fast between them a sheet area adapted to form, further on, a flank of similar outline in the structure along a given ridge line. A similar sheet area which was precedingly clamped between the bars 48 and 48' during the preceding cycle is simultaneously held fast between the two bars 49 and 49', the distance between the two sheet areas clamped between the two pairs of bars being spaced by two flank intervals.

The operation of the machine of FIGS. 16 and 17 provided with these four bars is as follows:

The jaws 48, 48' begin drawing the sheet forwardly in the direction of their plain, the total travel provided being equal to two flank breadths. This movement will have finally for its result to bring the flank in the making between the jaws 48 and 48' into the position allotted to it underneath the last flank which has precedingly been brought in the same manner during the preceding cycle into the space between the bars 49 and 49' between which it is now positioned.

To this end, the bars 49 and 49' rise and raise through the desired amount the flank or sheet area held between them together with the finished structure area 50 located above said bars.

During this double movement, the portion of a sheet comprised between the undulating and broken lines limiting the edges of the clamping system 49, 49' and 48, 48' is stretched between the latter and executes in space a compound rotation the opposite centers of which are not aligned since they lie actually along said edges which are broken or undulating.

When the flank which has just been formed reaches its final position underneath and preceding flank in the structure which is being formed, the section of a sheet which is not clamped between the bars and which has been turned around as disclosed while remaining connected with the beginning of one flank and the end of another, has entered the exact position of the intermediate flank. It also assumes its final shape, since during the preceding movement, the molding of its surface has been gradually reversed by reason of its being constrained to match at each moment the changing outline of its edges as produced through the gradual turning around of the latter.

At the end of the stroke considered, the clamping provided by the four joining bars marks more deeply on the ridge lines and on the flanks bounded thereby the positions reached and the shapes.

The cycle continues thenafter so as to return the different parts into their starting positions. To this end and while the bars 49, 49' remain stationary and continue consequently holding the structure in position, the jaws or bars 48–48' are released and recede through a distance equal to twice the breadth or height of a flank. At this point, the jaws close over the corrugated sheet which passes at S out of the forming means. In said position, it holds the sheet fast and consequently thereby the operating structure. Its action allows thus the two bars 49 and 49' to be released with reference to the two hollow sections in which they are engaged, said jaws or bars opening thus and sinking by one step so as to engage the two following recesses which have just been formed in the sheet, this latter movement finishing one elementary cycle of operation.

The beginning of a further elementary cycle is begun by drawing out again the sheet through the jaws 48, 48', the successive cycles progressing all in the same manner as the first described cycle.

Turning to FIGS. 18, to 24, the latter illustrate different relative operating positions which may be given in turn to the four bars of the machine of FIG. 16 and to the sheet and final structure 50 which latter is reduced for sake of simplification to a single line, during the main successive steps of a cycle of the type described hereinabove.

In FIG. 18, the bars or jaws 49, 49' of FIG. 16 are shown as holding the final structure 50 while the jaws 48, 48', are clamped over the original sheet 45.

In FIG. 19, the jaws 48, 48' have progressed by more than one half of their total allowed stroke, and the jaws 49, 49' have risen by the operative amount whereby the intermediate section of the sheet between the two pairs of jaws is modified and its shape is partly impressed.

In FIG. 20, the jaws 48, 48' have reached the end of their stroke, the newly formed flank has taken its position and the shape of the intermediate sheet area has been reversed and finally marked through the joining interengagement of the two bars or jaws.

In FIG. 21, the jaws 48, 48' have opened and then begun their return stroke.

In FIG. 22, the jaws 48, 48' have finished their return stroke and have closed over the corrugated sheet 45.

In FIG. 23, the two bars or jaws 49, 49' have moved apart.

In FIG. 24, they are now positioned to either side of a further flank incorporated into the chevron structure 50.

Turning back to FIG. 18, said jaws 49, 49' clamp between them the next flank in which a chevron folding is to be made. The cycle of operation may now begin over again.

The machine, the kinematic operation of which has just been described, includes two main carriages as shown in FIG. 16: a carriage 51 which carries the bars 48 and 48' and which serves as a driving member drawing out the sheet 45 and a carriage 52 which moves with the bars 49 and 49' and holds in position the chevron structure 50. It includes furthermore on each carriage two other mechanical members in the shape of jaws or slideways of a complementary type, the part played by which is to shift apart or to close respectively the bar 48 over the bar 48' and the bar 49 over the bar 49'. FIG. 16 shows the auxiliary jaw 53' corresponding to the jaws 48' and the jaws 54, 54' corresponding to the jaws 49 and 49', the jaw corresponding to the bar 48 being rigidly secured to the carriage 51 and its outline merging on the drawing with the outline of the jaw or bar 48'.

On one of the machines thus designed, these different movements are obtained by actuating the carriages through the agency of different rollers running in contacting relationship over four cams having a suitable outline and mounted on a common central shaft executing one revolution per cycle. In practice, however, these different movements may be executed in very different manners.

The machine thus constituted is suitable for producing structures the outer enclosing surfaces of which are plane and parallel, starting from sheets of any desired substance which are to be folded in chevron shape of a simple configuration, the flanks of the ridge lines being constituted by parallelograms or better still by corrugated surfaces. As a matter of fact, such corrugated surfaces allow much more readily a reversal in the shaping of the sheet then pleated or folded flanks, while producing however for an equal weight of material more resistant structures which are locked against deformation.

To the mechanical arrangements disclosed hereinabove should be added certain auxiliaries when the structures to be produced have parallel ridge lines which are not equidistant. In this case, the cams should for instance have a thick frusto-conical periphery so that their stroke may vary according as to whether the roller engaging them is in contact with them at one point or another of the cam generating line. Through these means or any other equivalent means, the strokes executed for the drawing of the sheet, the rotation of the intermediate area and for the raising of the structure may vary in length from one flank to the other, gradually or otherwise, provided that one or more guiding slopes of a suitable shape ensure the lateral shifting of the rollers over the cams. It is thus possible to form structures having the shape illustrated in FIG. 25 for instance.

In addition to the different methods for producing chevron structures according to the different methods as described hereinabove, I wish to mention also the possibility of employing conventional methods such as cold or hot stamping and swaging. These methods are applicable to the chevron folding of metals and substances which may be submitted to a certain elongation.

Thin metal sheets which are to be subjected to a deep stamping may as a matter of fact be stamped at room temperature over a certain extent between two suitably shaped dies of a press, provided however the angles of the structures to be constructing are not too sharp. Lower grade metal sheets and thicker sheets may require an annealing or machining at a raised temperature.

Through stamping or swaging, it is possible to produce directly the chevrons on metals and substances liable to be worked without it being previously necessary to shape them into sheets. The extent of the chevron shaping obtained at each compression step depends obviously on the power of the machine.

A remarkable fact is that the sheets of material are submitted during the stamping of a chevron structure to an elongation which, although it is not identical at all points, provides however for the passage from a developed shape to a complex chevron configuration which remains developable. The structure obtained, when flattened out, produces a sheet of a somewhat unequal thickness, which is larger than the original shape both as to length and to breadth. The stamping between chevron-shaped dies may form thus a practical method for drawing out a sheet through equally distributed local stresses.

All of the claims define a structure having ruled elementary surfaces which join each other along lines having points at which they change direction and at each of which points border lines of at least four of said elementary surfaces converge, the sum of the angles formed on said surfaces between said border lines at each of said points being equal to 360°. Due to the inherent limitations of manufacturing techniques, however, it is possible that the manufactured structure will not comply absolutely with the geometrical definitions in the claims.

For example, if the structures are made by means of a folding operation and a plurality of superposed sheets are folded at a given time, the ridge lines of the protrusions of the outer sheet may not be as well defined as those of the more centrally located sheets, viz, the walls of the protrusions in the former may be slightly rounded at their points of merger with other walls to a greater degree than those of the latter.

In view of this fact, the claims should be construed to cover such slight departures from the absolute geometric configurations which are defined.

When used in the specification and claims:

(1) the term "ruled elementary surface" or "ruled surface" is to be construed to cover a geometrical figure which can be generated by a straight line. Cylinders, cones and hyperbolic paraboloids are examples of such surfaces; and (2) the term "bends" is to be construed to cover material which has been shaped through a bending or folding operation, as distinguished from a stamping or embossing operation or the like. In the latter cases, as distinguished from the former, there is significant material flow, resulting in permanent deformation of the material.

It will be apparent to those skilled in the art that various modifications may be made in the steps of the methods which I have described, and the apparatus for carrying out such methods, and the chevron products produced thereby, without going beyond the bounds of my disclosure, and all such modifications which are within the scope of the appended claims I consider to be comprehended within the spirit of my disclosure.

What I claim is:

1. A structural element comprising a sandwich of two cover sheets and an interposed core sheet integrally secured with the cover sheets, said core sheet being corrugated with the corrugations extending in zig-zag parallel rows and each corrugation having a crest ridge secured to one cover sheet and a valley ridge secured to the other cover sheet, said ridges terminating in a peaked edge so that the core sheet can be formed by folding from a flat sheet without stretching the material, and said corrugations having inclined planar side walls between the crest and valley ridges.

2. A sandwich type structural element comprising spaced opposed cover sheets, a core sheet between said cover sheets, said core sheet being corrugated with the corrugations thereof extending in zig-zag parallel rows defining flow passages through the element, each corrugation having a pair of flat inclined side walls diverging from a crest ridge to spaced parallel valley ridges, said crest ridges each being integrally bonded to one of said cover sheets, said valley ridges and said crest ridges each forming a peaked ridge so that the core sheet can be formed from a flat sheet without stretching the material, each of said valley ridges being integrally bonded to the other of said cover sheets, and the zig-zag rows of corrugations extending continuously from one side edge to the other side edge of said element.

3. A sandwich type structural element composed of three sheets including spaced opposed cover sheets and an interposed corrugated core sheet, said core sheet having the corrugations thereof formed from flat pleats diverging from crest ridges to spaced parallel valley ridges, the corrugations extending in parallel zig-zag rows from one side to the opposite side of the element, the crest ridges of the corrugations being secured to one cover sheet, and the valley ridges of the corrugations being secured to the other cover sheet with each of said ridges forming a peak.

4. A sandwich type structural element composed of three sheets including spaced opposed substantially flat cover sheets and an interposed corrugated core sheet in bonded relation with the cover sheets, said core sheet having the corrugations thereof extending in parallel zig-zag rows with each row composed of two inclined flat pleats diverging from a crest ridge to spaced parallel valley ridges, each pleat having embossed spaced parallel ridges extending between the crest and valley ridges thereof to rigidify the pleats, each of said ridges forming a peak and each of said crest ridges being integrally bonded to one cover sheet, and each of said valley ridges being integrally bonded to the other cover sheet.

5. A process for pleating a sheet of pliable material, comprising the steps of forming a series of longitudinal corrugations in said sheet and intermittently reversing said corrugations along transverse sections of limited width.

6. A process according to claim 5 wherein said sections are all of the same width.

7. A process according to claim 6, comprising the further step of zig-zag-folding said sheet about transverse lines separating said sections from one another.

8. A process according to claim 5 wherein said corrugations are produced by the formation of progressively deepening longitudinal creases in said sheet.

9. A filter element comprised by a sheet of permeable filter material, said sheet being folded in zig-zag fashion along one series of parallel straight lines and being folded in zig-zag fashion along another series of alternately inclined straight lines substantially but not precisely at right angles to the said first series of lines, the aberration from rectangularity being such as to maintain pleats formed by said first folding apart from one another at minor acute angles.

10. A sandwich type structural element comprising spaced opposed cover sheets, a core sheet between said cover sheets, said core sheet being corrugated with the corrugations thereof extending in zig-zag parallel rows, each corrugation having a pair of flat inclined side walls diverging from a crest ridge to spaced parallel valley ridges, said crest ridges each being integrally bonded to one of said cover sheets, said valley ridges and said crest ridges each forming a peaked ridge so that the core sheet can be formed from a flat sheet without stretching the material, each of said valley ridges being integrally bonded to the other of said cover sheets, and the zig-zag rows of corrugations extending continuously from one side edge to the other side edge of said element.

11. A sheet of material having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said sheet of material being sandwiched between two enveloping surfaces each of which is in contact with the protrusions on one side of said sheet.

12. A sheet of material according to claim 11 in which said walls consist exclusively of adjacent flat surfaces in the form of parallelograms, said lines along which said surfaces join each other being composed of segments whose points of intersection are points at which said lines change direction and at each of which points terminates one of the border lines of each of four parallelograms.

13. A sheet of material according to claim 11 in which said walls consist of a number of ruled elementary surfaces which can be reduced respectively to the generating lines of said surfaces, said lines along which said surfaces join each other being non-rectilinear undulated lines all of whose points are points at which said non-rectilinear undulated lines change direction.

14. A sheet of materal having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said sheet being of such configuration that, if expanded into planar form, the sheet is completely developable on the plane to which it is expanded, said sheet of material being sandwiched between two enveloping surfaces each of which is in contact with the protrusions on one side of said sheet.

15. A sheet of material having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said sheet of material being bounded on at least one side by an enveloping surface which is in contact with the protrusions on said side.

16. A sheet of bendable material having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said sheet of bendable material being sandwiched between two enveloping surfaces each of which is in contact with the protrusions on one side of said sheet.

17. A sheet of material having a succession of alternate protrusions and recesses, the walls of each such protrusion and recess being composed exclusively of adjacent flat surfaces in the form of parallelograms joining each other in an undulatory manner at the ridges of said protrusions and recesses along a single line having a plurality of points at which it changes direction to form a plurality of undulations and at each of which points one of the border lines of each of four of said parallelograms converge, said lines along which said surfaces join each other being composed of segments of equal length whose points of intersection are points at which said lines change direction, said surfaces being ruled in a direction extending from one ridge line to another, the sum of the angles formed on said surfaces between said border lines at each of said points being equal to 360°, the height of at least some of said parallelograms varying from one to the other in at least one direction on said sheet.

18. A sheet of material having a succession of alternate protrusions and recesses, the walls of each such protrusion and recess being composed exclusively of a number of ruled elementary surfaces which can be reduced respectively to the generating lines of said surfaces and which join each other in an undulatory manner at the ridges of said protrusions and recesses along a single line having a plurality of points at which it changes direction to form a plurality of undulations and at each of which points border lines of at least four of said elementary surfaces converge, said lines along which said surfaces join each other being non-rectilinear undulated lines all of whose points are points at which said non-rectilinear undulated lines change direction, said surfaces being ruled in a direction extending from one ridge line to another, the sum of the angles formed on said surfaces between said border lines at each of said points being equal to 360°, the height of at least some of said walls varying from one to the other in at least one direction on said sheet.

19. A sheet of material having a succession of alternate protrusions and recesses, the walls of each such protrusion and recess being composed exclusively of adjacent flat surfaces in the form of triangles joining each other in an undulatory manner at the ridges of said protrusions and recesses along a single line having a plurality of points at which it changes direction to form a plurality of undulations, said lines along which said surfaces join each other being composed of segments whose points of intersection constitute points at which said lines change direction and at each of which points terminates one of the border lines of each of six triangles, said surfaces being ruled in a direction extending from one ridge line to another, the sum of the angles formed on said surfaces between said border lines at each of said points being equal to 360°.

20. A sheet of material having a succession of alternate protrusions and recesses, the walls of each such protrusion and recess being composed exclusively of a number of ruled elementary surfaces which can be reduced respectively to the generating lines of said surfaces and which join each other in an undulatory manner at the ridges of said protrusions and recesses along a single line having a plurality of points at which it changes direction to form a plurality of undulations and at each of which points border lines of at least four of said elementary surfaces converge, said lines along which said surfaces join each other being non-rectilinear undulated lines all of whose points are points at which said non-rectilinear undulated lines change direction, said surfaces being ruled in a direction extending from one ridge line to another, the sum of the angles formed on said surfaces between said border lines at each of said points being equal to 360°, said protrusions and recesses forming a plurality of said non-rectilinear undulated single lines which converge toward one another.

21. A sheet of material having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, at least one of said lines branching out into a plurality of lines, the surfaces which merge to form said branching line varying in height in the direction of said branching from the point at which the branching begins.

22. A sheet of material having a succession of alternate protrusions and recesses, the walls of each such protrusion and recess being composed exclusively of a number of ruled elementary surfaces which can be reduced respectively to the generating lines of said surfaces and which join each other in an undulatory manner at the ridges of said protrusions and recesses along a single line having a plurality of points at which it changes direction to form a plurality of undulations and at each of which points border lines of at least four of said elementary surfaces converge, said lines along which said surfaces join each other being non-rectilinear undulated lines all of whose points are points at which said non-rectilinear undulated lines change direction, said surfaces being ruled in a direction extending from one ridge line to another, the sum of the angles formed on said surfaces between said border lines at each of said points being equal to 360°, at least one of said lines branching out into a plurality of lines, the surfaces which merge to form said branching line varying in height in the direction of said branching from the point at which the branching begins.

23. A sheet of material having a succession of alternate protrusions and recesses, the walls of each such protrusion and recess being composed exclusively of adjacent flat surfaces in the form of triangles joining each other in an undulatory manner at the ridges of said protrusions and recesses along a single line having a plurality of points at which it changes direction to form a plurality of undulations, said lines along which said surfaces join each other being composed of segments whose points of intersection constitute points at which said lines change direction and at each of which points terminates one of the border lines of each of six triangles, said surfaces being ruled in a direction extending from one ridge line to another, the sum of the angles formed on said surfaces between said border lines at each of said points being equal to 360°, said sheet of material being sandwiched between two enveloping surfaces each of which is in contact with the protrusions on one side of said sheet.

24. A sheet of material having a succession of alternate protrusions and recesses, the walls of each such protrusion and recess being composed exclusively of a number of ruled elementary surfaces which can be reduced respectively to the generating lines of said surfaces and which join each other in an undulatory manner at the ridges of said protrusions and recesses along a single line having a plurality of points at which it changes direction to form a plurality of undulations and at each of which points border lines of at least four of said elementary surfaces converge, said lines along which said surfaces join each other being non-rectilinear undulated lines all of whose points are points at which said non-rectilinear undulated lines change direction, said surfaces being ruled in a direction extending from one ridge line to another, the sum of the angles formed on said surfaces between said border lines at each of said points being equal to 360°, said protrusions and recesses forming a plurality of said non-rectilinear undulated single lines which converge toward one another, said sheet of material being sandwiched between two enveloping surfaces each of which is in contact with the protrusions on one side of said sheet.

References Cited

UNITED STATES PATENTS

| | | | |
|---|---|---|---|
| 2,684,314 | 7/1954 | Ross | 154—30 |
| 2,896,692 | 7/1959 | Villoresi | 154—33.05 |
| 1,074,824 | 10/1913 | Wadsworth | 29—180 SS |
| 1,996,004 | 3/1935 | Fraser | 29—180 SS |
| 2,233,592 | 3/1941 | Dunajett | 29—180 SS |
| 2,481,046 | 9/1949 | Scurlock | 29—180 SS |
| 2,441,476 | 5/1948 | Ewald | 29—180 |
| 2,443,170 | 6/1948 | Smith | 29—180 |
| 696,359 | 3/1902 | Bailey | 153—76 |
| 1,122,092 | 12/1914 | Fedders | 153—76 |
| 1,868,302 | 7/1932 | Auger | 29—180 SS |
| 1,761,037 | 6/1930 | Gross | 189—34 D |
| 1,847,216 | 3/1932 | Hubbard | 156—340 |
| 2,862,624 | 12/1958 | Stokes | 210—493 |
| 2,901,951 | 9/1959 | Hochfeld | 156—343 |
| 2,963,128 | 12/1960 | Rapp | 154—45.9 SC |

FOREIGN PATENTS

| | | | |
|---|---|---|---|
| 430,328 | 2/1948 | Italy. | |
| 51,501 | 1/1912 | Austria | 154—30 |
| 476,269 | 7/1915 | France | 29—180 |

HYLAND BIZOT, Primary Examiner

U.S. Cl. X.R.

29—180, 183